Feb. 4, 1958  A. E. BRIX  2,822,243
PROCESS FOR PRODUCING MANGANESE DIOXIDE
Filed May 14, 1954
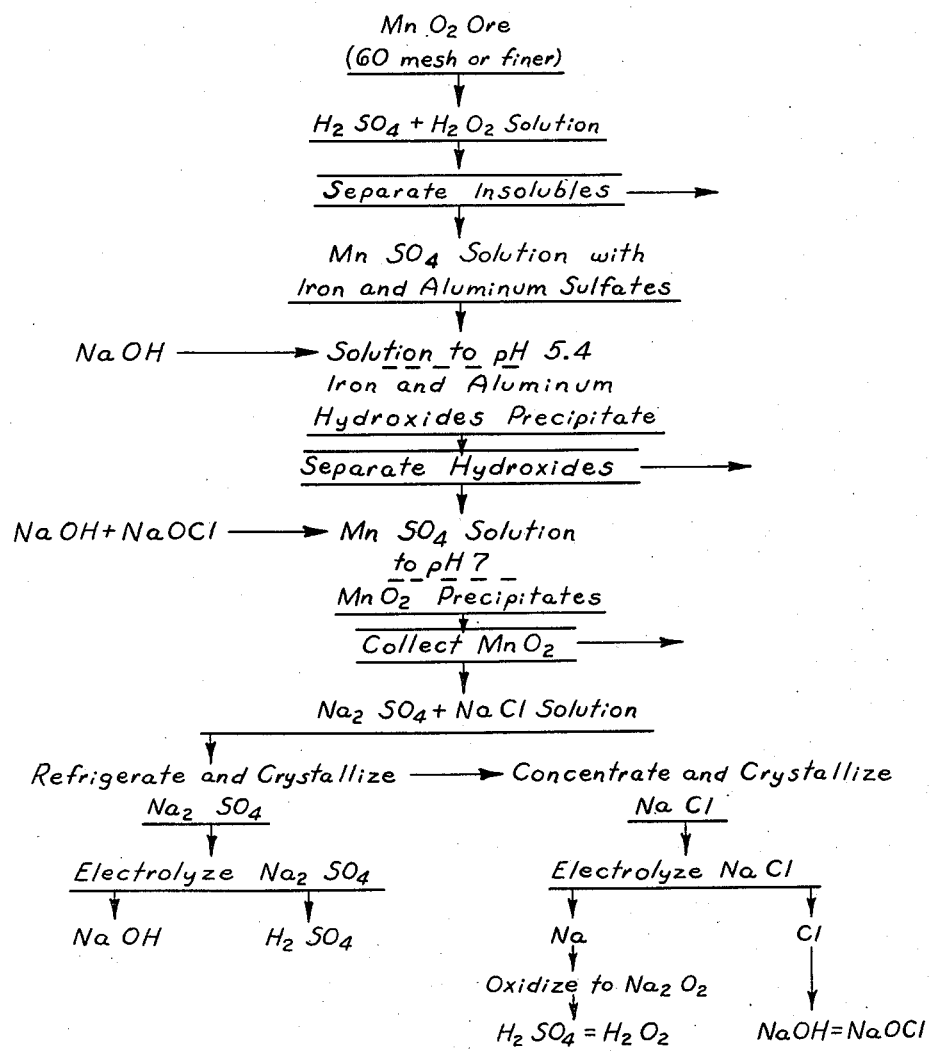
INVENTOR.
AAGE EMIL BRIX
BY HIS ATTORNEYS.
HARRIS, KIECH, FOSTER & HARRIS 2,822,243

PROCESS FOR PRODUCING MANGANESE DIOXIDE

Aage Emil Brix, Los Angeles, Calif.

Application May 14, 1954, Serial No. 429,994

4 Claims. (Cl. 23—145)

This invention relates to certain new and useful improvements in the manufacture of manganese dioxide, and particularly it relates to new methods and procedures in the preparation, treatment, and use of chemical compounds, mixtures, and transmuattions, as reagents and means for the extraction and refinement of manganese sulphate solutions and also for the direct recovery of manganese dioxide of high purity in a form for commercial use without further sintering, nodulizing, or compressing into briquettes.

Manganese is indispensable for the national economy and is mostly imported by ocean shipping at enormous expense of American capital. Numerous projects for the recovery of manganese from its native ores have been proposed; some have been installed at great cost; others have not been adopted because of excessive cost and other deficiencies such as difficulties in the use of sulphurous compounds as solvents. Sulphur dioxide was found to be detrimental to health; sulphuric acid did not effectively treat the manganese dioxide ores, unless reduced to manganese monoxide by expensive operations.

An object of this invention is to provide an inexpensive method for treatment, preparation, and use of chemical compounds and elements, as reagents in combination with sulphuric acid and sodium chloride derivatives, for the recovery of manganese dioxide, by the use of low cost equipment and procedures that may be economically operated wherever manganese ore is obtainable. Still further objects include:

(1) The provision of a new and improved method for the extraction of manganese sulphate solution from manganese ore.

(2) The provision of a new and improved method for refining manganese sulphate solution whereby iron, aluminum, or other contaminating materials present in the solution may be eliminated.

(3) The provision of a new and improved method for the separation and recovery of manganese dioxide from manganese sulphate solution.

(4) The provision of a new and improved method for the treatment of manganese sulphate solution for separation of manganese dioxide and its recovery in a physical condition of solid formation suitable for commercial adaptation without further sintering, nodulizing, or compressing into briquettes.

(5) The provision of a new and improved method for the recovery, from low grade manganese ores and fine formations of high grade manganese ores, of the manganese dioxide product in a high degree of quality suitable to meet the standard specifications adopted by the metallurgical, battery, dye, color, drug, chemical, textile, and other industries.

(6) The provision of a new and improved method of preparing, composing, and applying chemical reagents for the production of manganiferous products, including manganese dioxide separately and in combination with convenient equipment of practical construction; also, in combination with suitable equipment, the regeneration and reactivation of chemical reagents and substances for their repeated use in circulation throughout a system of equipment and apparatus provided for that purpose.

The low cost and economical procedures of this invention provide for a commercially feasible method of producing all specification grades of manganese dioxide. It also has the provision of contributing to the development of a substantial American industry and to the decrease of the dependence of the United States upon foreign nations and ocean shipping for essential manganese.

This invention does not relate to the mining of manganese ore nor to its reduction to proper sizes of minus sixty mesh or less. This invention does not relate to the design, composition, construction, or arrangement of the equipment and apparatus used therein, but it is the aim of the invention to use low cost, readily obtained, and easily transported equipment and apparatus capable of inexpensive installation and operation at even remote locations of manganese ore deposits having facilities for mining and reducing the ore. It will be noted that fir wood vats, as convenient vessels of practical construction to be used in the process of this invention, are low in cost and easily installed.

The method and improvement of this invention relate to the beneficiation of all manganese ores, but are notable for the treatment of low grade manganese ores and also as to high grade ores in fine formation, which are difficult to separate otherwise.

An understanding of the process of this invention may be had by reference to the accompanying drawing containing a flow diagram of the entire process as comprehended by this invention.

According to the new methods and improvements of this invention, the following is a description of its process for the extraction of manganese sulphate from its ores and the subsequent treatment for the recovery of the manganese dioxide.

The manganese ore, ground to a minus 60 mesh or finer by conventional methods, is brought into contact with a dilute sulphuric acid solution containing hydrogen peroxide. The following chemical reaction takes place referring only to the manganese dioxide contained in the ore. The numbers below each ingredient denote the approximate equivalent molecular weight involved in the reaction.

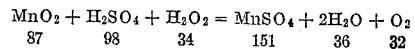

$$MnO_2 + H_2SO_4 + H_2O_2 = MnSO_4 + 2H_2O + O_2$$
$$87 \quad\quad 98 \quad\quad 34 \quad\quad 151 \quad\quad 36 \quad 32$$

A vigorous evolution of oxygen takes place. The oxygen adheres to each fine particle of ore, retarding the rate at which the particle descends to the bottom of the vat. At the same time oxygen is liberated from the descending particles, ascending through the mixture, thus causing a thorough agitation of the slurry. Thus complete contact with the solvent and ore is effected, so that with a sufficiently fine comminution of the ore each particle will have given up its manganese content before it reaches the bottom of the vat. Cessation of the evolution of gas denotes complete extraction of the ore, provided acid and peroxide are still present.

The mixture may be filtered after the evolution of gas has ceased, or it may be allowed to stand for twenty-four hours, when the insoluble residue will settle, leaving a clear supernatant liquid. This liquid contains mainly sulphates of manganese, iron and aluminum. This supernatant liquid is decanted or siphoned into another vat and its hydrogen ion concentration is brought to 5.4 (pH 5.4) by the addition of a solution of sodium hydroxide. At this point iron and aluminum precipitate as hydroxides, leaving the manganese in solution. The hydroxides are permitted to settle and the clear supernatant solution is decanted.

The clear manganese sulphate solution is next poured or run into a vat containing a mixture of sodium hydroxide and sodium hypochlorite and the following chemical reaction takes place. As above mentioned, the numbers below each chemical formula denote the equivalent molecular weights involved in the reaction.

$$MnSO_4 + 2NaOH + NaOCl = MnO_2 + Na_2SO_4 + NaCl + H_2O$$
$$151 \quad\quad 80 \quad\quad 74 \quad\quad 87 \quad\quad 142 \quad\quad 58 \quad\quad 18$$

The manganese dioxide precipitates as a black substance which is collected in a glass cloth bag or filter, which hangs from a mobile rack or stand. The filtrate contains sodium sulphate and sodium chloride, and since the reagents have been added according to the gram molecular weights depending upon the concentration of manganese sulphate and free sulphuric acid, the sodium sulphate and sodium chloride solution will have a hydrogen ion concentration of about 7 (pH 7) and there will be no free chlorine or hypochlorite present.

The manganese dioxide is washed repeatedly with water, while still in the bag, until all the sodium sulphate and sodium chloride has been removed. It is then dried, and in the process of drying, the mass shrinks into a compact hard cake, somewhat similar to what happens when clay dries. A crystalline form of manganese dioxide is thus formed, provided the precipitation is effected in a neutral medium and according to the quantities required in the above described chemical reaction.

The solution of sodium sulphate and sodium chloride is cooled (refrigerated), and the sodium sulphate crystallizes out as Glauber's salt while the sodium chloride remains in solution.

The Glauber's salt is put into solution again and this solution is electrolyzed, producing sodium hydroxide and dilute sulphuric acid, which enters the cycle as shown in the flow sheet.

The sodium chloride solution is concentrated and the sodium chloride is crystallized out. It is purified and is now ready for electrolysis in the fused state. Metallic sodium and chlorine are thus produced and enter the cycle as shown on the flow sheet. Various commercial cells are available in the industry for this purpose, and they need not be described here.

The metallic sodium is oxidized in air by heating to a temperature of 300 degrees centigrade, whereby sodium peroxide is formed. The sodium peroxide is next brought in contact with cold dilute sulphuric acid, whereby hydrogen peroxide is formed according to the following chemical reaction.

$$Na_2O_2 + H_2SO_4 = Na_2SO_4 + H_2O_2$$

Part of the sodium sulphate is removed by refrigeration and subsequent crystallization, and this sodium sulphate is utilized by electrolysis for the production of more sulphuric acid and sodium hydroxide.

The chlorine evolved by the electrolysis of fused sodium chloride is added to caustic soda, which forms sodium hypochlorite, which in turn is used in the precipitation of manganese dioxide as shown in the flow sheet. Part of the caustic soda is used for the partial neutralization of the manganese sulphate solution in the removal of the iron and aluminum salts.

Still another method of producing hydrogen peroxide in sulphuric acid solution and incorporated in this method of treating manganese ores is the electrolysis of the sulphuric acid as produced by the electrolysis of sodium sulphate.

By this procedure, well known to the chemical trade, persulphuric acid is produced, but in being hydrolyzed the persulphuric acid is changed to sulphuric acid and Caro's acid, which in turn is changed into hydrogen peroxide and sulphuric acid on further hydrolysis. Since only a weak solution of hydrogen peroxide is needed for the dissolution of the manganese in sulphuric acid, this method is practical since no separation of hydrogen peroxide, as such, is required from the electrolyzed sulphuric acid.

By introducing the above method for producing hydrogen peroxide, the need for metallic sodium and sodium peroxide as a source of hydrogen peroxide is obviated, but it is retained in the process as an alternate method, however. In this case, however, sodium chloride will have to be electrolyzed in solution rather than in the fused state, so that sodium hypochlorite needed for the oxidation in the final precipitation of manganese dioxide can be procured. Commercial methods for doing this have been known for many years and are available.

Having disclosed the chemical reactions involved in my invention and the electrolytic means of making the process cyclic, it will be understood that the invention is not to be limited by precise reagents, conditions and proportions, but rather is to be construed to include the use of obvious equivalents in accordance with the spirit and scope of appended claims.

I claim:

1. A method for producing manganese dioxide consisting of the steps of: subjecting a finely ground ore containing manganese dioxide along with iron and aluminum constituents to the action of a dilute sulfuric acid solution containing hydrogen peroxide to reduce the manganese dioxide in accord with the equation $$MnO_2 + H_2SO_4 + H_2O_2 = MnSO_4 + 2H_2O + O_2$$

with oxygen evolution to agitate the mixture and yielding a solution of manganese, aluminum, and iron sulfates and an insoluble residue; separating said insoluble residue from the solution; adjusting the pH of the solution to about pH 5.4 with sodium hydroxide to precipitate the aluminum and iron solubles as hydroxides; separating such iron and aluminum hydroxides; introducing sodium hydroxide and sodium hypochlorite to the remaining manganese sulfate solution to precipitate manganese dioxide in accord with the equation $$MnSO_4 + 2NaOH + NaOCl = MnO_2 + NaSO_4 + NaCl + H_2O$$

and recovering the manganese dioxide precipitate.

2. A method as in claim 1 wherein the steps are conducted in the absence of applied heat.

3. In a process for producing manganese dioxide the steps consisting of: subjecting a finely ground ore containing manganese dioxide and other mineral constituents including compounds of iron and aluminum to the action of a dilute solution of sulphuric acid containing hydrogen peroxide to reduce the manganese dioxide according to the equation $$MnO_2 + H_2SO_4 + H_2O_2 = MnSO_4 + 2H_2O + O_2$$

the oxygen liberation agitating the ore pulp; continuing the reaction to substantial cessation of oxygen gas liberation, the reaction yielding a solution of manganese sulphate and other dissolved mineral constituents including iron and aluminum sulphates and an insoluble residue; separating said insoluble residue from the solution; selectively precipitating from the resultant solution dissolved mineral constituents other than manganese while leaving manganese in solution, the precipitation from said resultant solution including precipitating therefrom as hydroxides the aluminum and iron constituents thereof by adjusting the pH value to about 5.4 with an alkali metal hydroxide; and recovering the manganese solution for conversion of the manganese content thereof into manganese dioxide.

4. A process as in claim 3 including commingling sodium hydroxide and sodium hypochlorite with said solution separated from the hydroxide precipitate to effect pH 7 and precipitate manganese dioxide therefrom, and recovering the latter.

(References on following page)

References Cited in the file of this patent

UNITED STATES PATENTS

| | | |
|---|---|---|
| 210,541 | Konig | Dec. 3, 1878 |
| 1,259,099 | Holmes | Mar. 12, 1918 |
| 1,269,914 | Ellis et al. | June 18, 1918 |
| 1,291,867 | Haslup et al. | Jan. 21, 1919 |
| 1,323,690 | Gravely | Dec. 2, 1919 |
| 1,330,738 | Ellis et al. | Feb. 10, 1920 |
| 2,123,250 | Muller et al. | July 12, 1938 |
| 2,176,774 | Sweet et al. | Oct. 17, 1939 |
| 2,539,823 | Furman et al. | Jan. 30, 1951 |

FOREIGN PATENTS

| | | |
|---|---|---|
| 615,980 | Great Britain | Jan. 14, 1949 |

OTHER REFERENCES

Rodden: "Analytical Chemistry of the Manhattan Project," Div. VIII, vol. I, McGraw-Hill Book Co., Inc., pages 88–89 and 438–39.

Mitchell: "Recent Advances in Analytical Chemistry" (1931), Blakiston & Son, Inc., vol. II, pages 137–139 and 276–278.

Jacobson: "Encyclopedia of Chemical Reactions" (1951), vol. IV, page 505.

Mellor: "A Comprehensive Treatise on Inorganic and Theoretical Chemistry" (1922), vol. 2, pages 657, 658.